United States Patent
Wei et al.

(10) Patent No.: US 10,181,888 B2
(45) Date of Patent: Jan. 15, 2019

(54) APPARATUS AND METHOD FOR FULL-DIMENSIONAL MIMO WITH ONE-DIMENSIONAL CSI FEEDBACK

(71) Applicant: QUALCOMM INCORPORATED, San Diego, CA (US)

(72) Inventors: Chao Wei, Beijing (CN); Yu Zhang, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/504,232

(22) PCT Filed: Sep. 28, 2014

(86) PCT No.: PCT/CN2014/087664
§ 371 (c)(1),
(2) Date: Feb. 15, 2017

(87) PCT Pub. No.: WO2016/045116
PCT Pub. Date: Mar. 31, 2016

(65) Prior Publication Data
US 2017/0244462 A1    Aug. 24, 2017

(51) Int. Cl.
*H04B 7/06* (2006.01)
*H04B 7/0456* (2017.01)

(52) U.S. Cl.
CPC ......... *H04B 7/0626* (2013.01); *H04B 7/0469* (2013.01); *H04B 7/0478* (2013.01)

(58) Field of Classification Search
CPC ... H04B 7/0626; H04B 7/0478; H04B 7/0469
(Continued)

(56) References Cited

U.S. PATENT DOCUMENTS

2013/0162476 A1  6/2013  Thomas et al.
2013/0308714 A1  11/2013 Xu et al.
(Continued)

FOREIGN PATENT DOCUMENTS

WO  WO-2013024350 A2  2/2013
WO  WO-2013144361 A1  10/2013

OTHER PUBLICATIONS

International Search Report and Written Opinion—PCT/CN2014/087664—ISA/EPO—dated Jun. 29, 2015.
(Continued)

*Primary Examiner* — Shuwang Liu
*Assistant Examiner* — Fitwi Hailegiorgis
(74) *Attorney, Agent, or Firm* — Norton Rose Fulbright US LLP

(57) ABSTRACT

Methods and corresponding apparatuses for wireless communication are disclosed. The method for wireless communication includes dividing a two-dimensional antenna array to a plurality of sub-arrays, mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, and transmitting one or more elevation CSI-RS from the one-dimensional vertical CSI-RS port array and one or more azimuth CSI-RS from the one-dimensional horizontal CSI-RS port array. Methods and corresponding apparatuses for CSI feedback mechanism are also disclosed.

14 Claims, 12 Drawing Sheets

(58) Field of Classification Search
USPC .......................................... 375/267; 370/252
See application file for complete search history.

(56) References Cited

U.S. PATENT DOCUMENTS

2014/0098689 A1*  4/2014  Lee ..................... H04B 7/0469
                                                        370/252
2015/0078472 A1*  3/2015  Vook ................... H04B 7/0617
                                                        375/267

OTHER PUBLICATIONS

Supplementary European Search Report—EP14902804—Search Authority—Munich—dated May 16, 2018.
Vook F.W., et al., "Product codebook feedback for massive MIMO with cross-polarized 2D antenna arrays", 2014 IEEE 25th Annual International Symposium on personal, Indoor, and Mobile Radio Communication (PIMRC), IEEE, Sep. 2, 2014 (Sep. 2, 2014), pp. 502-506, XP032789691, DOI: 10.1109/PIMRC.2014.7136217.

* cited by examiner

APPARATUS AND METHOD FOR FULL-DIMENSIONAL MIMO WITH ONE-DIMENSIONAL CSI FEEDBACK

BACKGROUND

Field

Aspects of the present disclosure relate generally to wireless communication systems, and more particularly, to full-dimensional multiple-input, multiple-output (MIMO) systems with one or more one-dimensional channel state information (CSI) feedback.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance communication technologies not only to meet the growing demand for mobile broadband access, but to advance and enhance the user experience with mobile communications.

SUMMARY

In one aspect of the disclosure, a method for wireless communication is disclosed. The method for wireless communication includes dividing a two-dimensional antenna array to a plurality of sub-arrays, mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, and transmitting one or more elevation CSI-RS from the one-dimensional vertical CSI-RS port array and one or more azimuth CSI-RS from the one-dimensional horizontal CSI-RS port array. Each of the plurality of sub-arrays includes the same number of antenna elements. The mapping includes applying intra-sub-array antenna aggregation in each of the plurality of sub-arrays and applying inter-sub-array antenna aggregation among the plurality of sub-arrays.

In one aspect of the disclosure, a method for wireless communication is disclosed. The method for wireless communication includes receiving elevation channel state information (CSI) feedback for a one-dimensional vertical channel state information reference signal (CSI-RS) port array, receiving azimuth CSI feedback for a one-dimensional horizontal CSI-RS port array, and utilizing dynamic point selection to determine to transmit data from the one-dimensional vertical CSI-RS port array or from the one-dimensional horizontal CSI-RS port array based on received elevation CSI feedback and azimuth CSI feedback.

In one aspect of the disclosure, a method for wireless communication is disclosed. The method for wireless communication includes mapping a two-dimensional antenna array into a one-dimensional vertical channel state information reference signal (CSI-RS) port array and a one-dimensional horizontal CSI-RS port array, and receiving an aggregated CSI feedback, wherein the aggregated CSI feedback is associated with both the one-dimensional vertical CSI-RS port array and the one-dimensional horizontal CSI-RS port array.

In another aspect of the disclosure, an apparatus for wireless communication is disclosed. The apparatus for wireless communication includes means for dividing a two-dimensional antenna array to a plurality of sub-arrays, means for mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, and means for transmitting one or more elevation CSI-RS from the one-dimensional vertical CSI-RS port array and one or more azimuth CSI-RS from the one-dimensional horizontal CSI-RS port array. Each of the plurality of sub-arrays includes the same number of antenna elements. The means for mapping includes means for applying intra-sub-array antenna aggregation in each of the plurality of sub-arrays and means for applying inter-sub-array antenna aggregation among the plurality of sub-arrays.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks.

The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
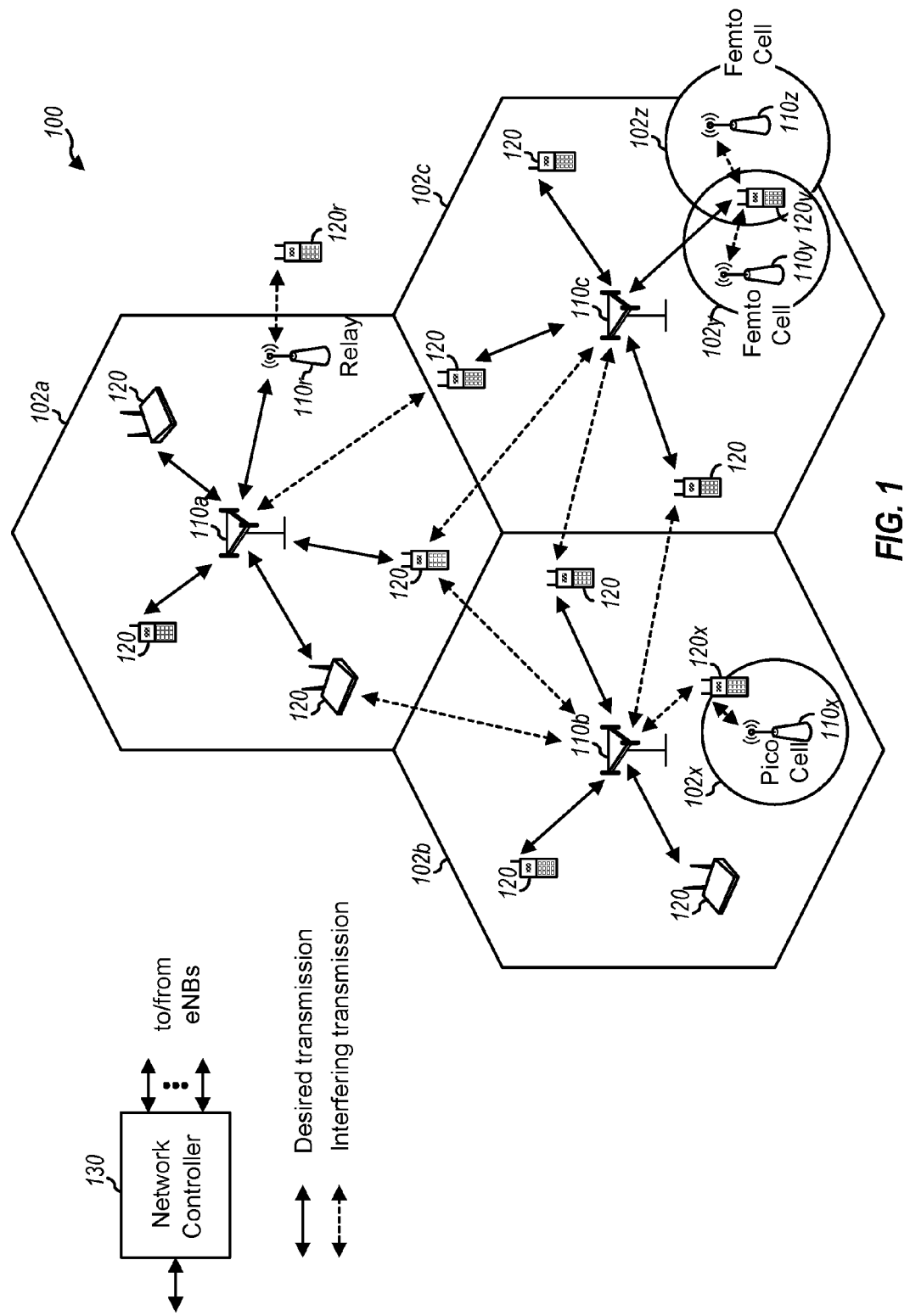
FIG. 1 is a block diagram illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a smart phone, a tablet, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
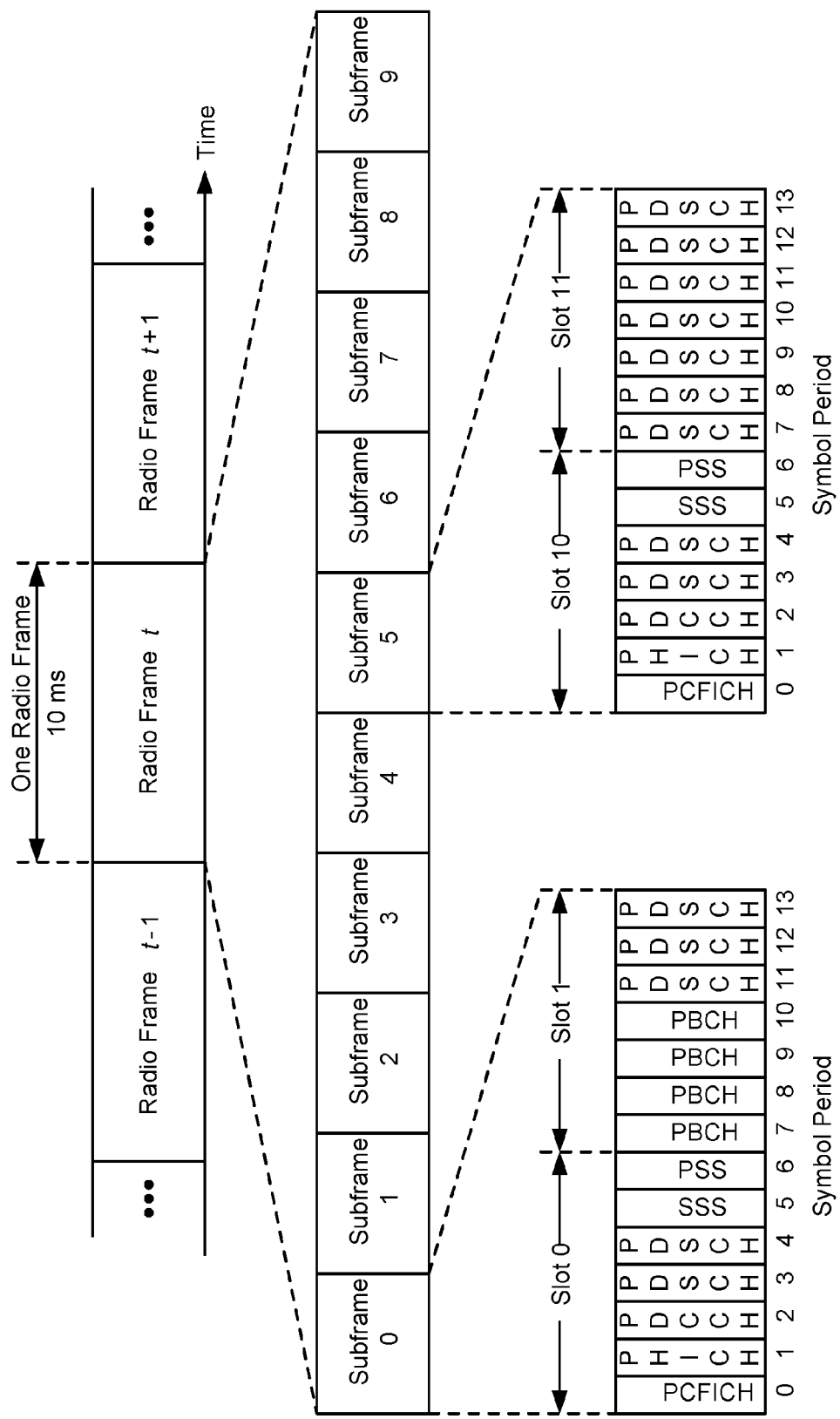
FIG. 2 is a block diagram illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARD). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
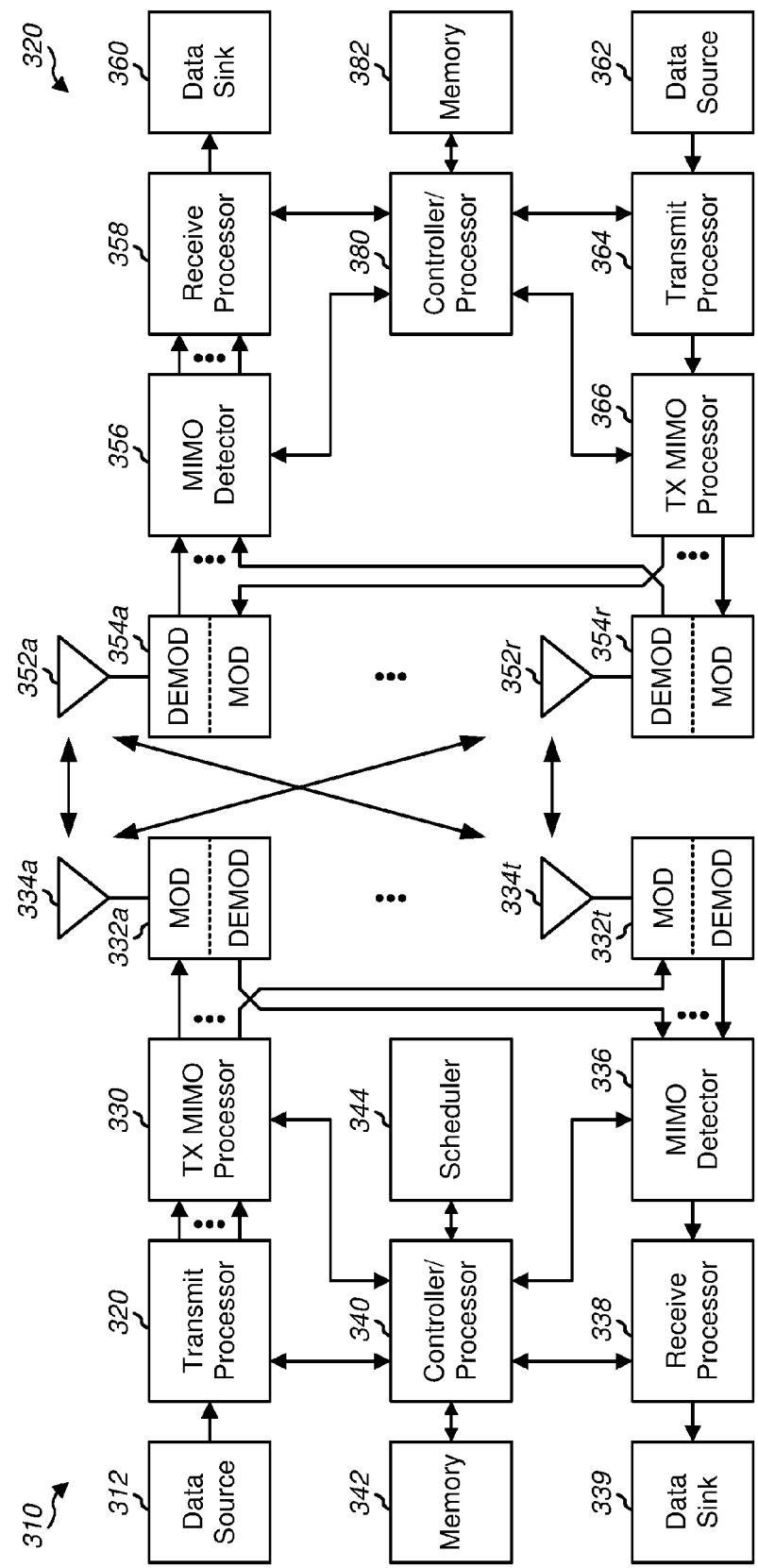
FIG. 3 is a block diagram illustrating a design of a base station and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In order to increase system capacity, three-dimensional (3D)-MIMO technology has been considered, in which an eNB uses a two-dimensional (2D) antenna array with a large number of antennas. Beamforming has typically implemented using only azimuth dimension of a 3D multi-path propagation. However, with the advance in smart antenna technologies, 3D beamforming now allows for dynamic beam steering in both the vertical and horizontal dimension to improve MIMO system capacity.

For a 2D antenna array with a large number of antennas, channel state information (CSI) feedback from one or more user equipments (UEs) may be used by an eNB. CSI may include one or more of: a precoding matric indicator (PMI), a rank indicator (RI), and a channel quality indicator (CQI), and may be determined based on downlink channel estimation and predefined PMI codebooks. However, acquiring CSI feedback for a large scale antenna array with a large number of antennas is a challenge due to channel estimation complexity, downlink CSI reference signal (CSI-RS) overhead, and uplink CSI feedback overhead.

Figure 4A:
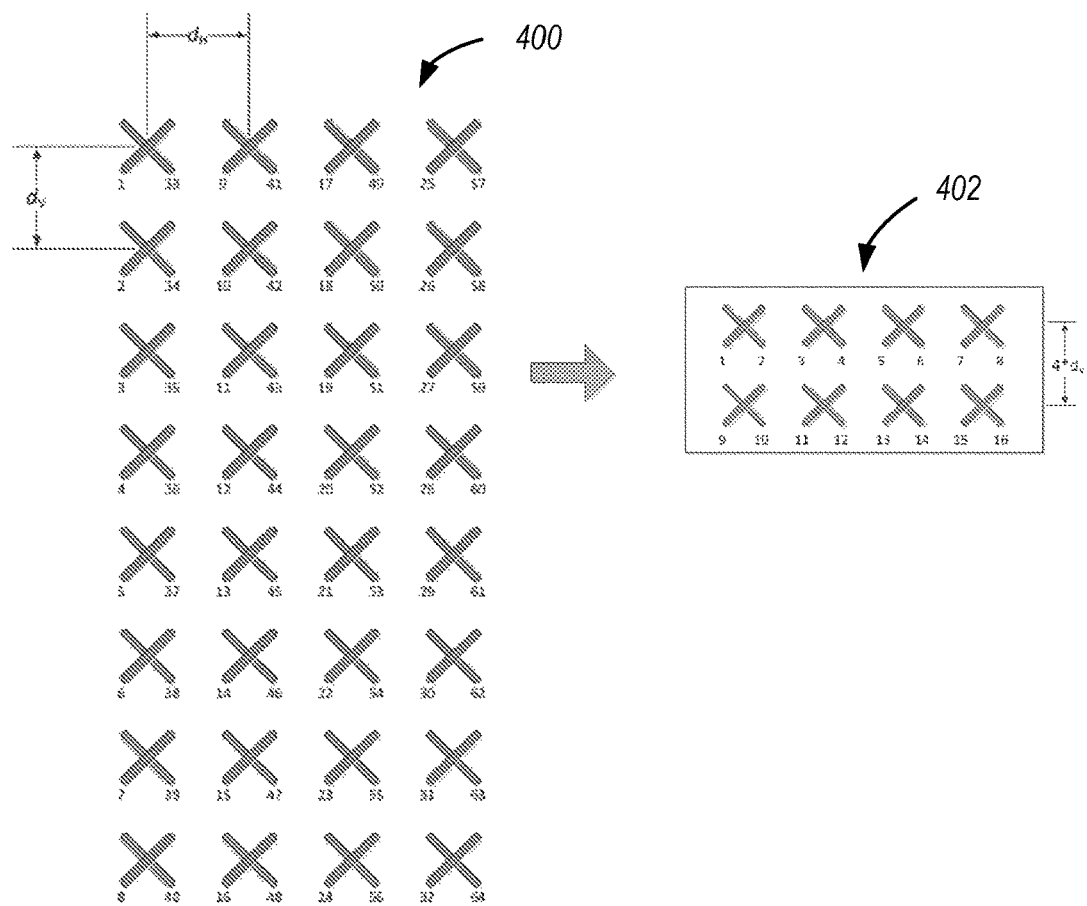
FIG. 4A is an exemplary two-dimensional antenna array.

Acquisition of CSI for a 2D antenna array may be achieved by compressing a large scale antenna array to a smaller size antenna array for CSI measurement. For example, a conventional sixty-four (64)-TX cross-polarized 2D array 400 may be mapped to a sixteen (16)-TX cross-polarized 2D array. With reference to FIG. 4A, convention 64-TX cross-polarized 2D array 400 with eight (8) rows and eight (8) columns of antenna elements is mapped to a 16-TX cross-polarized 2D array with sixteen (16) CSI-RS ports 402. Accordingly, the UE may feedback 2-port elevation CSI and 8-port azimuth CSI or 16-port 2D joint CSI. For the compressed 16-TX cross-polarized 2D array, positive elevation beamforming gain may be achieved for the zenith angle between eighty-five (85) and one hundred and seven (107) degrees. However, the corresponding elevation beamforming gain may be smaller due to the reduced number of elevation ports, especially for high-rise UEs.

Figure 4B:
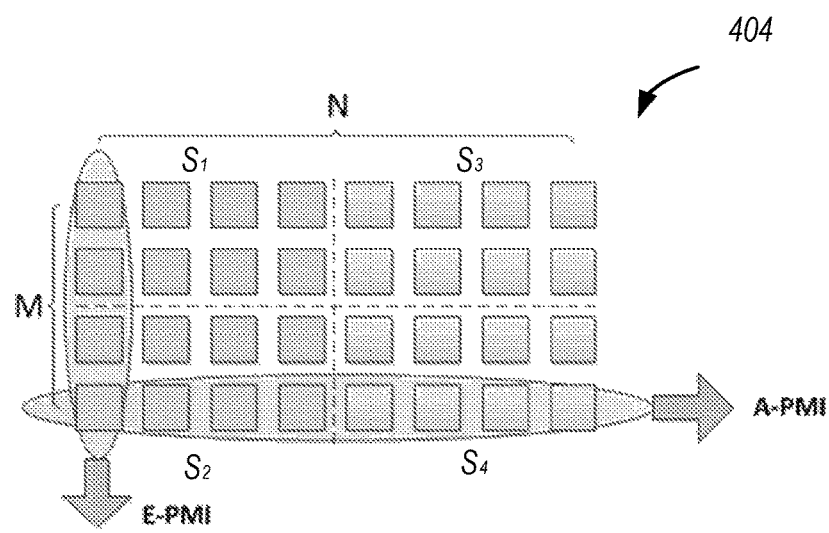
FIG. 4B is an exemplary two-dimensional antenna array.

Acquisition of CSI for a 2D antenna array may be also achieved by measuring elevation CSI and azimuth CSI separately for a subset of the full 2D array and designing a product codebook to control CSI measurements in elevation and azimuth dimensions. With reference to FIG. 4B, elevation CSI may be measured from M elevation CSI-RS ports and azimuth CSI may be measured from N azimuth CSI-RS X-pol ports. Elevation CSI-RS ports may be mapped from antenna elements in the elevation dimension with or without aggregation of rows of antenna elements of a 2D antenna array. Azimuth CSI-RS ports may be mapped from antenna elements in the azimuth dimension with or without aggregation of columns of antenna elements of a 2D antenna array. The product codebook may be generated based on elevation codebook selection and azimuth codebook selection. Accordingly, the transmit beamforming vector for total M×N antenna ports at an eNB is Kronecker product of the two codebook selections. Correspondingly, a UE may use such two codebook selections to choose CQI and a preferred rank. The preferred rank may indicate the number of streams in the determined dimension. However, this method of acquisition of CSI may have some inherent limitations. For example, the elevation codebook is only used to co-phase the azimuth CSI-RS ports in the vertical dimension. As a further example, elevation CSI only support rank-1 but the antenna array has X-pol structure. If rank 2 is determined in the azimuth CSI, different elevation co-phasing weights may be required for each spatial stream in azimuth dimension. As such, the Kronecker product codebook may be problematic when elevation angular spread is large. Accordingly, aspects of the present disclosure propose an approach of antenna aggregation for elevation and azimuth CSI-RS transmission for receiving elevation and azimuth CSI feedback.

Various aspects of the present disclosure provide that a 2D antenna array may be mapped to two 1D arrays using antenna aggregation. For example, a M(vertical)×N(horizontal) (hereinafter referred to as "M(V)×N(H)") cross-polarized 2D antenna array may be mapped to two X-pol 1D arrays using antenna aggregation. M may represent the column number or a subset of the column number of the cross-polarized 2D antenna array. N may represent the row number or a subset of the row number of the cross-polarized 2D antenna array. The two X-pol 1D arrays may include an M-port cross-polarized vertical CSI-RS port array and a N-port cross-polarized horizontal CSI-RS port array. Each 1D array may be associated with its spatial coverage. Each spatial coverage may not overlap with each other. An eNB may transmit one or more elevation CSI-RS from the M-port cross-polarized vertical CSI-RS port array and/or one or more azimuth CSI-RS from the N-port cross-polarized horizontal CSI-RS port array. Correspondingly, a UE may feedback elevation CSI for the M-port cross-polarized vertical CSI-RS port array and/or feedback azimuth CSI for the N-port cross-polarized horizontal CSI-RS port array. The UE may feedback elevation CSI and azimuth CSI separately or jointly to configure a UE-specific 3D beamforming weight vector. The numbers of CSI ports of the elevation CSI and azimuth CSI for the subsets of antenna elements of the M(V)×N(H) cross-polarized 2D antenna array may be determined based on the capability of the UE.

Mapping a M(V)×N(H) cross-polarized 2D antenna array to two X-pol 1D arrays may include dividing the M(V)×N(H) cross-polarized 2D antenna array into a plurality of sub-arrays and applying intra-sub-array antenna aggregation in each of the plurality of sub-arrays and inter-sub-array antenna aggregation among the plurality of sub-arrays. With reference to FIG. 4B, a M(V)×N(H) cross-polarized 2D antenna array 404 may be divided into four sub-arrays ($S_1$, $S_2$, $S_3$, and $S_4$). Each sub-array may have the same number of antenna elements. For example, $S_1$, $S_2$, $S_3$, and $S_4$ all have M/2(V)×N/2(H) antenna elements.

Figure 5A:
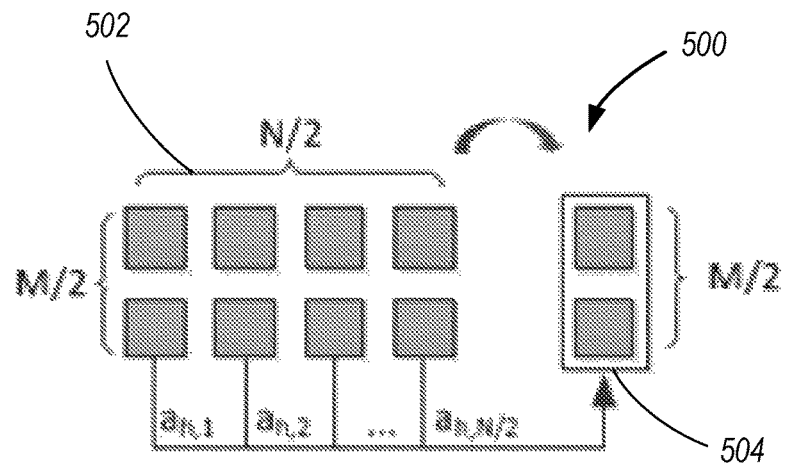
FIG. 5A illustrates an intra-sub-array antenna aggregation of rows of the antenna elements in a sub-array according to one aspect of the present disclosure.
Figure 5B:
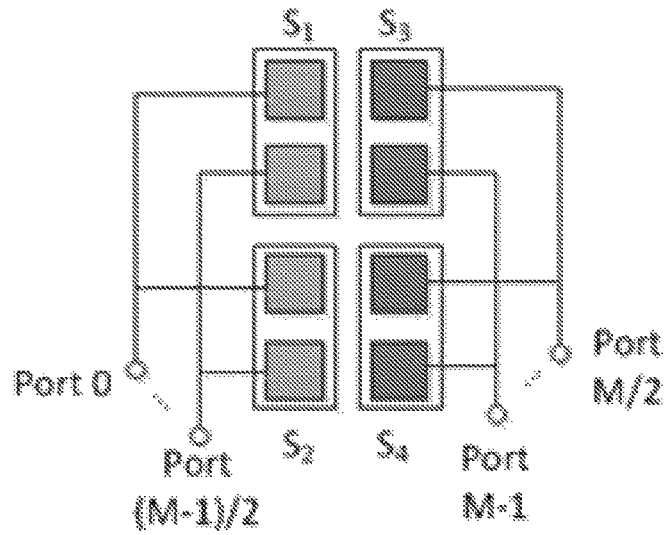
FIG. 5B illustrates an inter-sub-array antenna aggregation of a plurality of aggregated vertical sub-arrays from a plurality of sub-arrays according to one aspect of the present disclosure.
Figure 5C:
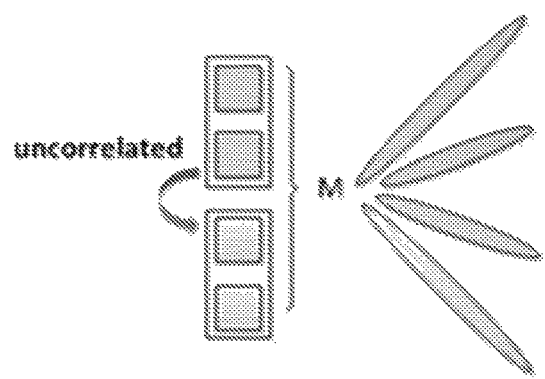
FIG. 5C illustrates beams being transmitted from a 1D vertical CSI-RS port array/TP-E according to one aspect of the present disclosure.

FIG. 5A illustrates an intra-sub-array antenna aggregation of rows of the antenna elements in a sub-array 500 with M/2(V)×N/2(H) antenna elements according to one aspect of the present disclosure. In sub-array 500, all rows of the antenna elements 502 may be aggregated to form an aggregated vertical sub-array 504. In some aspects of the present disclosure, the intra-sub-array antenna aggregation may be applied with a subset of rows of the antenna elements 502 in sub-array 500. FIG. 5B illustrates an inter-sub-array antenna aggregation of a plurality of aggregated vertical sub-arrays from a plurality of sub-arrays to form an 1D vertical CSI-RS port array, which is also referred to as a TP-E, according to one aspect of the present disclosure. FIG. 5C illustrates beams being transmitted from the 1D vertical CSI-RS port array/TP-E.

With reference to FIG. 5B, the aggregated vertical sub-array from the sub-array $S_1$ may aggregate with the aggregated vertical sub-array from the sub-array $S_2$ and the aggregated vertical sub-array from the sub-array $S_3$ may aggregate with the aggregated vertical sub-array from the sub-array $S_4$ by using a 2×1 weight vector. With reference to FIG. 5C, the aggregated vertical sub-arrays from different sub-arrays may be uncorrelated to each other. In some aspects of the present disclosure, the inter-sub-array aggregation for mapping a 2D antenna array to a 1D vertical CSI-RS port array may be applied with a subset of sub-arrays.

Figure 6A:
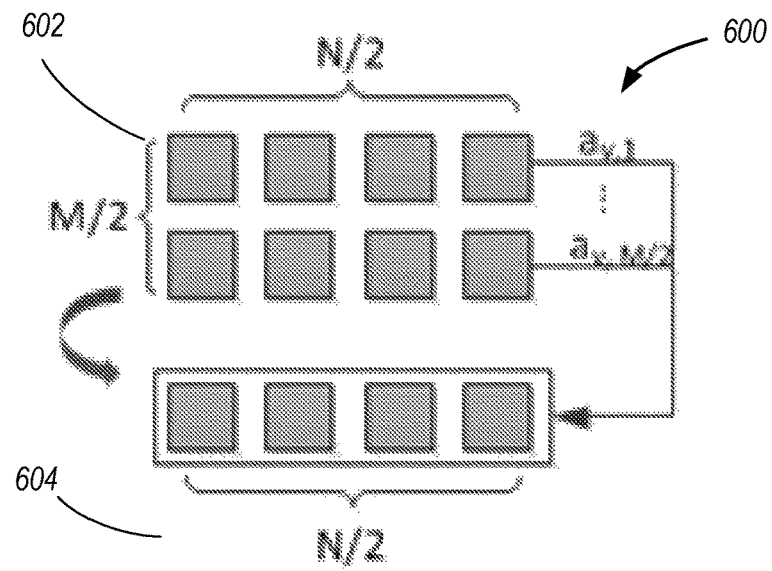
FIG. 6A illustrates an intra-sub-array antenna aggregation of columns of the antenna elements in a sub-array according to one aspect of the present disclosure.
Figure 6B:
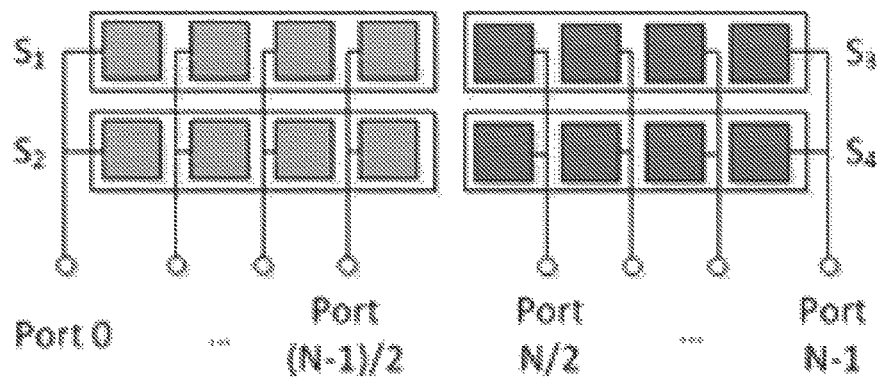
FIG. 6B illustrates an inter-sub-array antenna aggregation of a plurality of aggregated horizontal sub-arrays from a plurality of sub-arrays according to one aspect of the present disclosure.
Figure 6C:
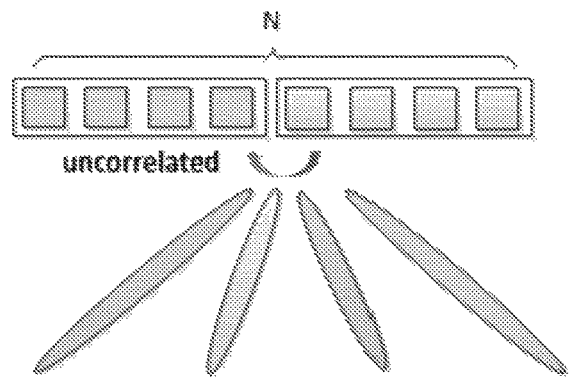
FIG. 6C illustrates beams being transmitted from the 1D horizontal CSI-RS port array/TP-A according to one aspect of the present disclosure.

FIG. 6A illustrates an intra-sub-array antenna aggregation of columns of the antenna elements in a sub-array 600 with M/2(V)×N/2(H) antenna elements according to one aspect of the present disclosure. In sub-array 600, all columns of the antenna elements 602 may be aggregated to form an aggregated horizontal sub-array 604. In some aspects of the present disclosure, the intra-sub-array antenna aggregation may be applied with a subset of columns of the antenna elements 602 in sub-array 600. FIG. 6B illustrates an inter-sub-array antenna aggregation of a plurality of aggregated horizontal sub-arrays from a plurality of sub-arrays to form an 1D horizontal CSI-RS port array, which is also referred to as a TP-A, according to one aspect of the present disclosure. FIG. 6C illustrates beams being transmitted from the 1D horizontal CSI-RS port array/TP-A.

With reference to FIG. 6B, the aggregated horizontal sub-array from the sub-array $S_1$ may aggregate with the aggregated horizontal sub-array from the sub-array $S_2$ and the aggregated horizontal sub-array from the sub-array $S_3$ may aggregate with the aggregated horizontal sub-array from the sub-array $S_4$. With reference to FIG. 6C, the aggregated horizontal sub-arrays from different sub-arrays may be uncorrelated to each other. In some aspects of the present disclosure, the inter-sub-array aggregation for mapping a 2D antenna array to a 1D horizontal CSI-RS port array may be applied with a subset of sub-arrays.

In some aspects of the present disclosure, application of intra-sub-array antenna aggregation and inter-sub-array antenna aggregation may include utilizing an intra-sub-array aggregation weight vector and an inter-sub-array aggregation weight vector. The weight vectors may be cell-specific and dimension-specific. As such, intra-sub-array antenna aggregation and inter-sub-array antenna aggregation weight vectors for mapping 2D antenna array to a 1D elevation CSI-RS port array may be different from intra-sub-array antenna aggregation and inter-sub-array antenna aggregation weight vectors for mapping a 2D antenna array to a 1D azimuth CSI-RS port array. Accordingly, a beam for transmitting elevation CSI-RS from the 1D elevation CSI-RS port array may be orthogonal to a beam for transmitting azimuth CSI-RS from the 1D azimuth CSI-RS port array in the elevation dimension.

In additional aspects of the present disclosure, the intra-sub-array aggregation weight vector for mapping a 2D antenna array to a 1D vertical CSI-RS port array (TP-E) may be a non-constant modulus (CM) sector beam vector or a small delay cyclic delay (CDD) precoding based CM vector and the intra-sub-array aggregation weight vector for mapping a 2D antenna array to a 1D horizontal CSI-RS port array (TP-A) may be determined based on a target down tilt as follows.

$$W_{intra}^{(A)} = b_{M/2}(\theta_{etilt}) \quad \text{(Eq. 1)}$$

where $b_M(\theta_{etilt}) = \frac{1}{\sqrt{M}}(1, b(\theta) \ldots b^{M-1}(\theta))^T$ and $$b(\theta) = \exp\left(-j\frac{2\pi}{\lambda}d_v\cos\theta\right)$$

where $W_{int\ ra}^{(A)}$, represents the inter-sub-array aggregation weight vector for mapping a 2D antenna array to a 1D horizontal CSI-RS port array (TP-A); where M represents the column number of the 2D antenna array; where b(θ) represents a target down tilt of a beam.

In some aspects of the present disclosure, the inter-sub-array aggregation weight vector for mapping a 2D antenna array to a 1D vertical CSI-RS port array (TP-E) and to a 1D horizontal CSI-RS port array (TP-A) may be CM weight vectors as follows.

$$W_{intter}^{(E)} = \frac{1}{\sqrt{2}}(1, \alpha)^T; \text{and} \quad \text{(Eq. 2)}$$

$$W_{intter}^{(A)} = \frac{1}{\sqrt{2}}(1, b^{M/2}(\theta)\cdot\beta)^T \quad \text{(Eq. 3)}$$

where $W_{int\ ter}^{(E)}$ represents the inter-sub-array aggregation weight vector for mapping a 2D antenna array to a 1D vertical CSI-RS port array (TP-E); where $W_{int\ ter}^{(A)}$ represents the inter-sub-array aggregation weight vector for mapping a 2D antenna array to a 1D horizontal CSI-RS port array (TP-A).

In some preferred aspects of the present disclosure, the parameters α and β may be selected so that patterns of the 1D vertical CSI-RS port array (TP-E) and 1D horizontal CSI-RS port array (TP-A) in the elevation dimension may be complementary to each other.

The parameters α and β as well as the intra-sub-array aggregation weight vector and the inter-sub-array aggregation weight vector for mapping a 2D antenna arrays to the 1D vertical CSI-RS port array (TP-E) and to the 1D horizontal CSI-RS port array (TP-A) may be determined based on the number of the antenna elements in a column of the 2D antenna array, spacing between the antenna elements, a target down tilt, elevation dimension coverage, or combination thereof.

For example, for a scenario with eight (8) vertical antenna elements and with 0.9 lambda spacing, the inter-sub-array aggregation weight vector can be selected as follows.

$$W_{intter}^{(E)} = \frac{1}{\sqrt{2}}(1, -j)^T; \text{and} \quad \text{(Eq. 4)}$$

$$W_{intter}^{(A)} = \frac{1}{\sqrt{2}}(1, b^{M/2}(\theta))^T \quad \text{(Eq. 5)}$$

where the parameter α is equal to −j and the parameter β is equal to 1.

The elevation beamforming gain for high-rise UEs may be improved compared to a sixteen (16) CSI-RS port design as illustrated above, especially for the zenith angle between eight (80) and ninety (90) degrees.

In some aspects of the present disclosure, the intra-sub-array aggregation weight vector and the inter-sub-array aggregation weight vector for mapping a 2D antenna array to two 1D CSI-RS port array may be jointly represented by following mapping matrices.

$$T^{(E)} = (I_2 \otimes W_{int\ er}^{(E)}) \otimes (I_{M/2} \otimes W_{int\ ra}^{(E)}) \quad \text{(Eq. 6); and}$$

$$T^{(A)} = (I_2 \otimes W_{int\ er}^{(A)}) \otimes (W_{int\ ra}^{(A)} \otimes I_{N/2}) \quad \text{(Eq. 7)}$$

where $W_{int\ ter}^{(E)}$, $W_{int\ tra}^{(E)}$, $W_{int\ ter}^{(A)}$, and $W_{int\ ra}^{(A)}$ are the intra-sub-array aggregation weight vector and the inter-sub-array aggregation weight vector for mapping a 2D antenna array to a 1D vertical CSI-RS port array (TP-E) and a 1D horizontal CSI-RS port array (TP-A); where I represents an identity matrix.

In some embodiments, a M(V)×N(H) 2D antenna array may have a large number of TX ports, e.g., more than sixty-four (64)-TX ports, in a massive MIMO application. If M or N is too large for a UE to process, then the large M(V)×N(H) 2D antenna array may be decomposed into multiple sub-arrays, e.g., four M/2(V)×N/2(H) 2D sub-arrays. Correspondingly, the UE may feedback an eNB with CSI for one or a subset of M/2(V)×N/2(H) 2D sub-arrays. Elevation CSI feedback may be associated with an M/2(V) CSI-RS port array. Azimuth CSI feedback may be associated with a N/2(H) CSI-RS port array. The large M(V)×N(H) 2D antenna array may be decomposed for multiple times until the number of CSI ports are able to be supported by the UE.

It should be noted that the numbers of antenna elements, CSI-RS ports, sub-arrays and dimensions of antenna arrays are not limited to any specific number.

Figure 7:
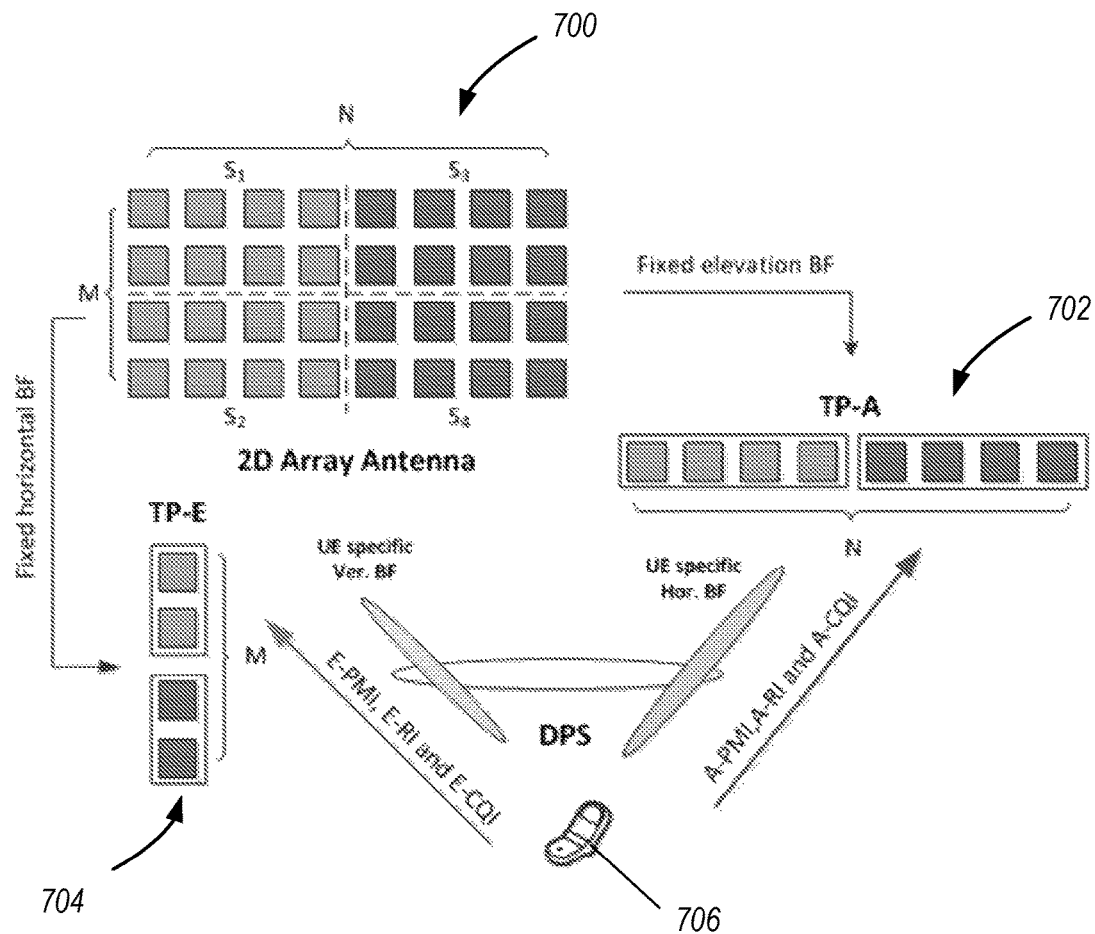
FIG. 7 illustrates an independent CSI feedback for two 1D CSI-RS port arrays according to one aspect of the present disclosure.

FIG. 7 illustrates an independent CSI feedback for two 1D CSI-RS port arrays according to one aspect of the present disclosure. In FIG. 7, a UE 706 may measure and feedback CSI for a 1D vertical CSI-RS port array (TP-E) 704 and for a 1D horizontal CSI-RS port array (TP-A) 702 to an eNB (not shown in FIG. 7) separately. UE 706 may measure elevation CSI, e.g., elevation PMI, elevation RI, and elevation CQI, based on received elevation CSI-RS from 1D vertical CSI-RS port array (TP-E) 704. UE 706 may measure azimuth CSI, e.g., azimuth PMI, azimuth RI, and azimuth CQI, based on received azimuth CSI-RS from 1D horizontal CSI-RS port array (TP-A) 706. 1D elevation CSI-RS port array (TP-E) 704 and 1D horizontal CSI-RS port array (TP-A) 706 may be mapped from a 2D antenna arrays 700 at the eNB.

In some aspects of the present disclosure, the elevation and azimuth PMI/RI may be selected independently for each dimension. The transmit beamforming vectors for total M×N antenna ports may be configured at an eNB based on received elevation and azimuth PMI. For example, an eNB may combine received azimuth PMI with intra-sub-array and inter-sub-array weight vectors for mapping 2D antenna array 700 to 1D azimuth CSI-RS port array (TP-A) 702. An eNB may combine received elevation PMI with intra-sub-array and inter-sub-array weight vectors for mapping 2D antenna array 700 to 1D elevation CSI-RS port array (TP-E) 704.

In some aspects of the present disclosure, a dynamic point selection (DPS) may be utilized to determine to transmit data from 1D vertical CSI-RS port array (TP-E) 704 using beamforming vector determined from elevation PMI or 1D azimuth CSI-RS port array (TP-A) 702 using beamforming vector determined from azimuth PMI based on received elevation and azimuth CQI. However, there may be no coordination between beamforming in an elevation dimension and beamforming in an azimuth dimension. UE-specific adaptation may be achieved only in one dimension, e.g., either in the elevation or azimuth dimension.

Figure 8:
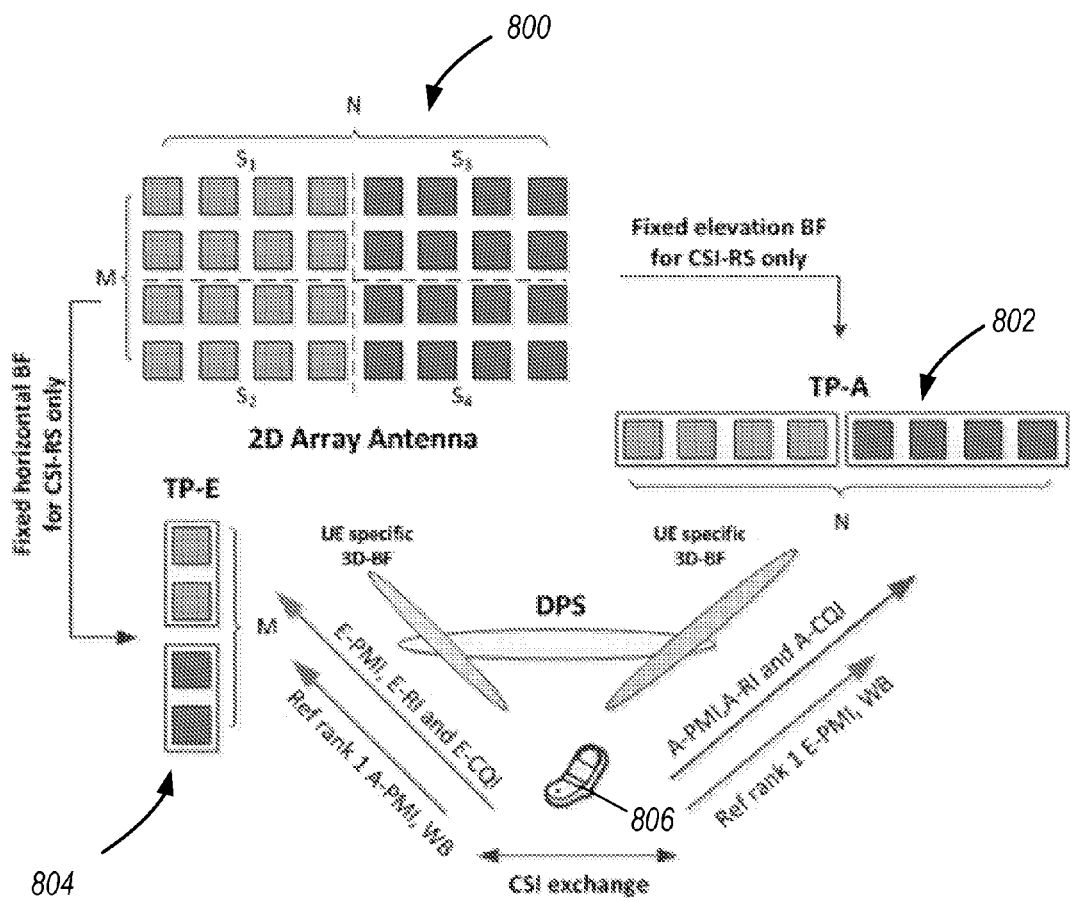
FIG. 8 illustrates an aggregated CSI feedback for two 1D CSI-RS port arrays according to one aspect of the present disclosure.

FIG. 8 illustrates an aggregated CSI feedback for two 1D CSI-RS port arrays according to one aspect of the present disclosure. Aggregated CSI feedback for a 1D CSI-RS port array may also consider CSI feedback for another 1D CSI-RS port array. As such, beamforming in both elevation and azimuth dimensions may be co-related to each other and, therefore, a UE-specific three-dimensional (3D) beamforming may be achieved. For example, aggregated azimuth CSI feedback transmitted from a UE 806 may be associated with both a 1D vertical CSI-RS port array (TP-E) 804 and a 1D horizontal CSI-RS port array (TP-A) 802. The aggregated azimuth CSI feedback may include an azimuth PMI, an azimuth RI, an azimuth CQI, and a reference wideband vertical precoding vector for 1D horizontal CSI-RS port array (TP-A) 802. The reference wideband vertical precoding vector may be determined based on 1D vertical CSI-RS port array (TP-E) 804 and may be a rank-1 vertical precoding vector. The reference wideband vertical precoding vector may be further determined based on the averaged channel covariance matrix in the elevation dimension as follows.

$$R^{(E)} = E\{\Sigma_j H_{E,j}^{(+)H} H_{E,j}^{(+)} + H_{E,j}^{(-)H} H_{E,j}^{(-)}\} \quad \text{(Eq. 8)}$$

where $H_{E,j} = [H_{E,j}^{(+)H} H_{E,j}^{(-)}]$ is a vertical CSI-RS port channel associated with 1D vertical CSI-RS port array (TP-E) 804 on the j-th frequency resource block.

Accordingly, a UE-specific intra-sub-array weight vector for 1D horizontal CSI-RS port array (TP-A) 802 may be given as follows.

$$W_{UE,int\ ra}^{(A)} = \text{evec}\{R^{(E)}\} \quad \text{(Eq. 9)}$$

where evec denotes the dominant eigenvector of the averaged channel covariance matrix in the elevation dimension.

It should be noted that a UE-specific inter-sub-array weight vector for 1D horizontal CSI-RS port array (TP-A) 802 may be also updated based on the reference wideband vertical precoding vector. Accordingly, a UE-specific 3D beamforming weight vector for data transmission from 1D horizontal CSI-RS port array (TP-A) 802 may be generated as follows.

$$W_{3D}^{(A)} = (I_2 \otimes W_{UE,int\ er}^{(A)}) \otimes (W_{UE,int\ ra}^{(A)} \otimes I_{N/2}) \cdot W_{UE}^{(A)} \quad \text{(Eq. 10)}$$

where $W_{UE}^{(A)}$ is associated with UE specific azimuth PMIs measured from 1D horizontal CSI-RS port array (TP-A) 802; where $W_{UE,int\ er}^{(A)}$ and $W_{UE,int\ ra}^{(A)}$ are associated with the reference wideband vertical precoding vector based on the averaged channel covariance matrix of 1D vertical CSI-RS port array (TP-E) 804.

In some aspects of the present disclosure, a UE may determine an elevation beamforming gain offset based on the reference wideband vertical precoding vector. Accordingly, the azimuth CQI in aggregated CSI feedback for an 1D horizontal CSI-RS port array (TP-A) 802 may be determined by adding the additional elevation beamforming gain offset associated with the reference wideband vertical precoding vector. The azimuth PMI in aggregated CSI feedback may be associated with a subband, and, therefore, the azimuth CSI feedback may be associated with both wideband vertical beamforming and subband horizontal beamforming.

As a further example, aggregated elevation CSI feedback transmitted from a UE 806 may be also associated with both a 1D vertical CSI-RS port array (TP-E) 804 and a 1D horizontal CSI-RS port array (TP-A) 802. The aggregated elevation CSI feedback may include an elevation PMI, an elevation RI, an elevation CQI, and a reference wideband horizontal precoding vector for 1D vertical CSI-RS port array (TP-E) 804. The reference wideband horizontal precoding vector may be determined based on 1D horizontal CSI-RS port array (TP-A) 802 and may be a rank-1 horizontal precoding vector. The reference wideband horizontal precoding vector may be further determined based on the averaged channel covariance matrix in the azimuth dimension as follows.

$$R^{(A)} = E\{\Sigma_j H_{A,j}^{(+)H} H_{A,j}^{(+)} + H_{A,j}^{(-)H} H_{A,j}^{(-)}\} \quad \text{(Eq. 11)}$$

where $H_{A,j} = [H_{A,j}^{(+)H} H_{A,j}^{(-)}]$ is a horizontal CSI-RS port channel associated with 1D horizontal CSI-RS port array (TP-A) 802 on the j-th frequency resource block.

Accordingly, a UE-specific intra-sub-array weight vector for 1D vertical CSI-RS port array (TP-A) 804 may be given as follows.

$$W_{UE,int\ ra}^{(E)} = \text{evec}\{R^{(A)}\} \quad \text{(Eq. 12)}$$

where evec denotes the dominant eigenvector of the average channel covariance matrix in the azimuth dimension.

It should be noted that a UE-specific inter-sub-array weight vector for 1D vertical CSI-RS port array (TP-E) 804 may be also updated based on the reference wideband horizontal precoding vector. Accordingly, a UE-specific 3D beamforming weight vector for data transmission from 1D vertical CSI-RS port array (TP-E) 804 may be as follows.

$$W_{3D}^{(E)} = (I_2 \otimes W_{UE,int\ er}^{(E)}) \otimes (I_{M/2} \otimes W_{UE,int\ ra}^{(E)}) \cdot W_{UE}^{(E)} \quad \text{(Eq. 13)}$$

where $W_{UE}^{(E)}$ is associated with UE specific elevation PMIs measured from 1D vertical CSI-RS port array (TP-E) 804; where $W_{UR,int\ er}^{(E)}$ and $W_{UE,int\ ra}^{(E)}$ are associated with the reference wideband horizontal precoding vector based on the averaged channel covariance matrix of 1D horizontal CSI-RS port array (TP-A) 802.

In some aspects of the present disclosure, a UE may determine an azimuth beamforming gain offset based on the reference wideband horizontal precoding vector. Accordingly, the elevation CQI in aggregated CSI feedback for a 1D vertical CSI-RS port array (TP-E) 804 may be determined by adding the additional azimuth beamforming gain offset associated with the reference wideband horizontal precoding vector. The elevation PMI in aggregated CSI feedback may be associated with a subband, and, therefore, the elevation CSI feedback may be associated with both wideband horizontal beamforming and subband vertical beamforming.

In some aspects of the present disclosure, a dynamic point selection (DPS) may be utilized to determine to transmit data from 1D vertical CSI-RS port array (TP-E) 804 or 1D azimuth CSI-RS port array (TP-A) 802 based on received aggregated elevation and azimuth CSI feedback, e.g., elevation and azimuth CQI.

Figure 9:
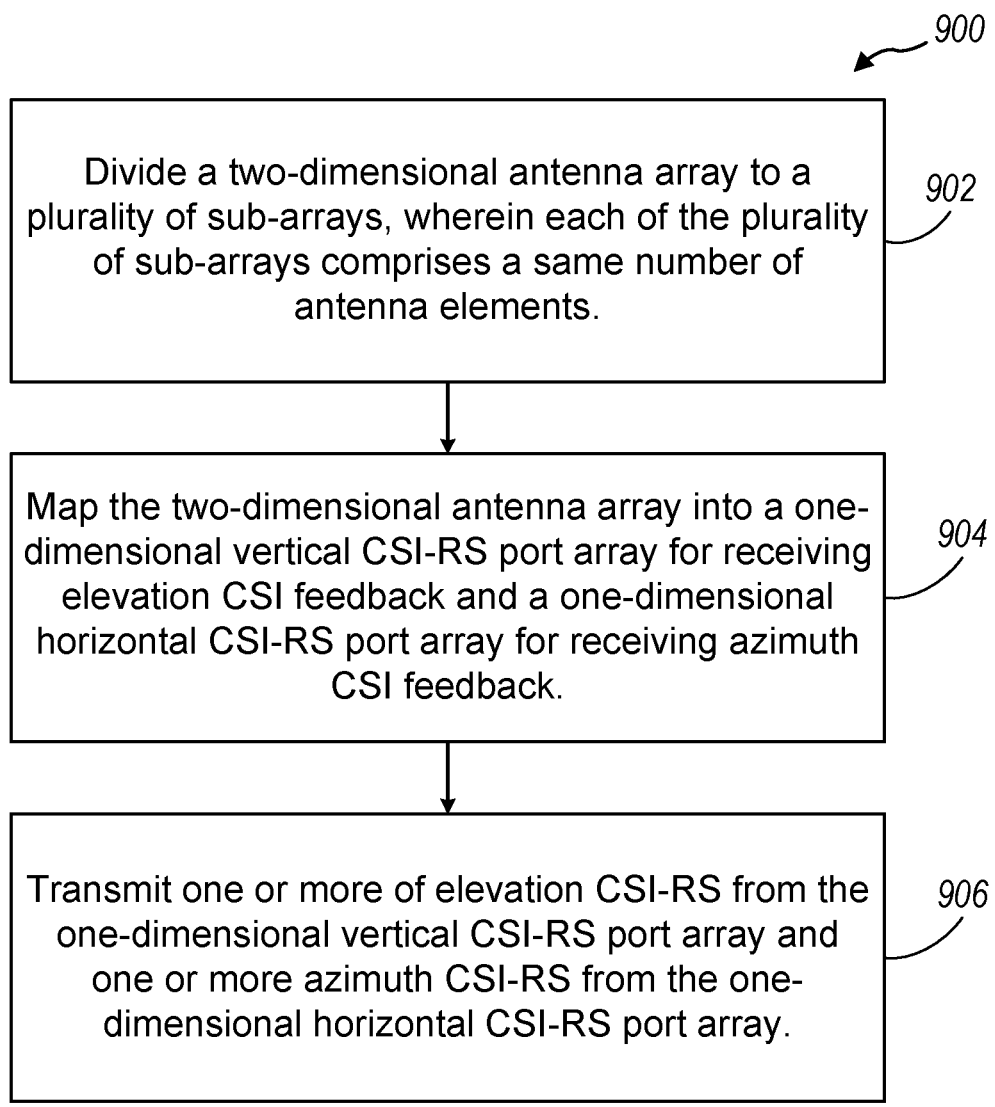
FIG. 9 is a functional block diagram illustrating exemplary blocks executed to implement one aspect of the present disclosure.

FIG. 9 is a functional block diagram 900 illustrating exemplary blocks executed to implement one aspect of the present disclosure. At block 902, a network entity, such as an eNB, may divide a two-dimensional antenna array to a plurality of sub-arrays. Each of the plurality of sub-arrays may include a same number of antenna elements. At block 904, the eNB may map the two-dimensional antenna array into a one-dimensional vertical CSI-RS port array for receiving elevation CSI feedback and a one-dimensional horizontal CSI-RS port array for receiving azimuth CSI feedback. The mapping may include applying intra-sub-array antenna aggregation in each of the plurality of sub-arrays and applying inter-sub-array antenna aggregation among the plurality of sub-arrays. At block 906, the eNB may transmit one or more elevation CSI-RS from the one-dimensional vertical CSI-RS port array and/or one or more azimuth CSI-RS from the one-dimensional horizontal CSI-RS port array. Correspondingly, a UE may receive the one or more elevation CSI-RS from the one-dimensional vertical CSI-RS port array of the eNB and/or the one or more azimuth CSI-RS from the one-dimensional horizontal CSI-RS port array of the eNB and transmit corresponding elevation CSI feedback and/or azimuth CSI feedback to the eNB. Based on the capability of the UE, including the number of CSI ports that the UE is able to support, the eNB may determine mapping methods and acquire channel state information from the UE to implement a full-dimensional MIMO system.

Figure 10:
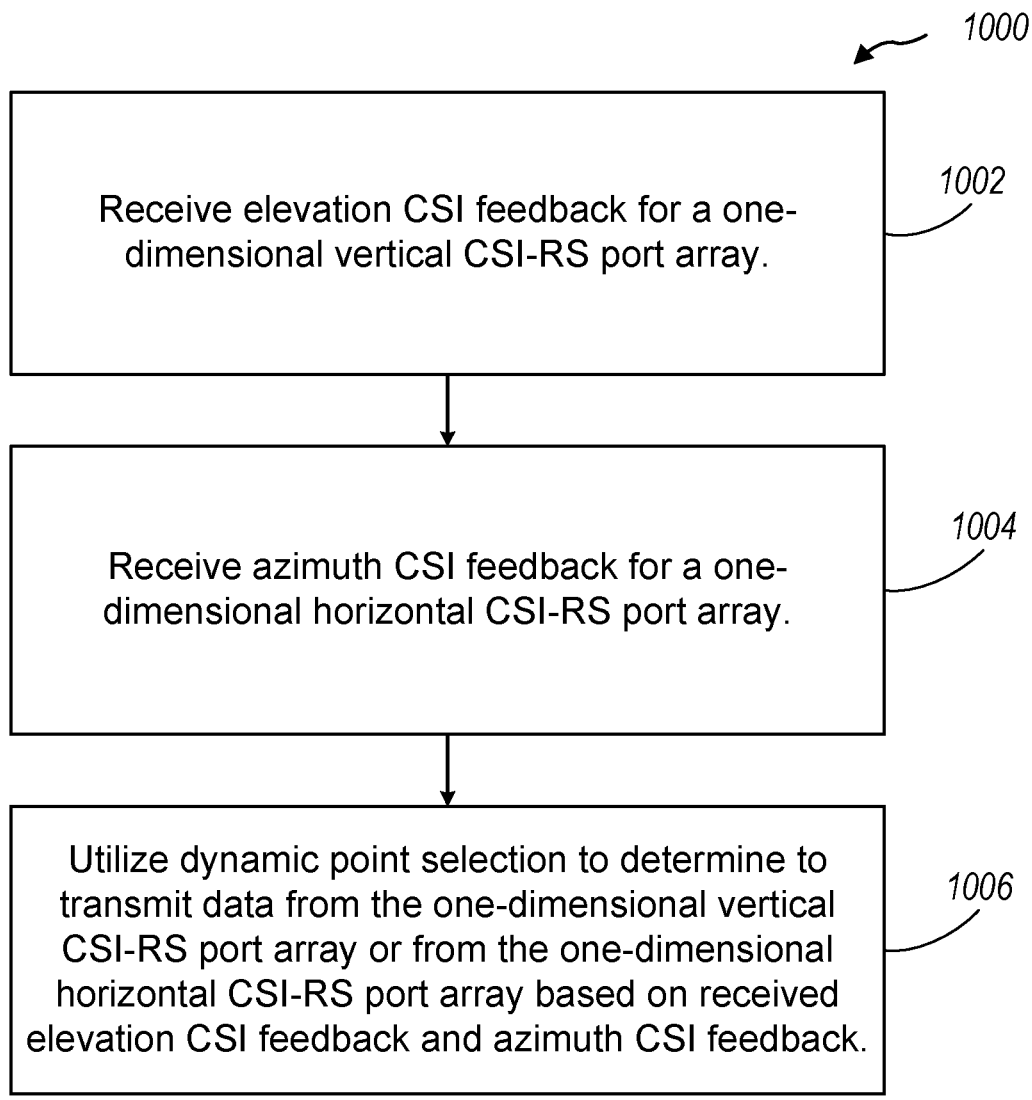
FIG. 10 is a functional block diagram illustrating exemplary blocks executed to implement one aspect of the present disclosure.

FIG. 10 is a functional block diagram 1000 illustrating exemplary blocks executed to implement one aspect of the present disclosure. At block 1002, a network entity, such as an eNB, may receive elevation CSI feedback for a one-dimensional vertical CSI-RS port array. At block 1004, the eNB may receive azimuth CSI feedback for a one-dimensional horizontal CSI-RS port array. At block 1006, the eNB may utilize dynamic point selection to determine to transmit data from the one-dimensional vertical CSI-RS port array or from the one-dimensional horizontal CSI-RS port array based on received elevation CSI feedback and azimuth CSI feedback. Correspondingly, a UE may transmit elevation CSI feedback and azimuth CSI feedback to the eNB for the eNB to decide to transmit data from the one-dimensional vertical CSI-RS port array or from the one-dimensional horizontal CIS-RS port array or both arrays.

Figure 11:
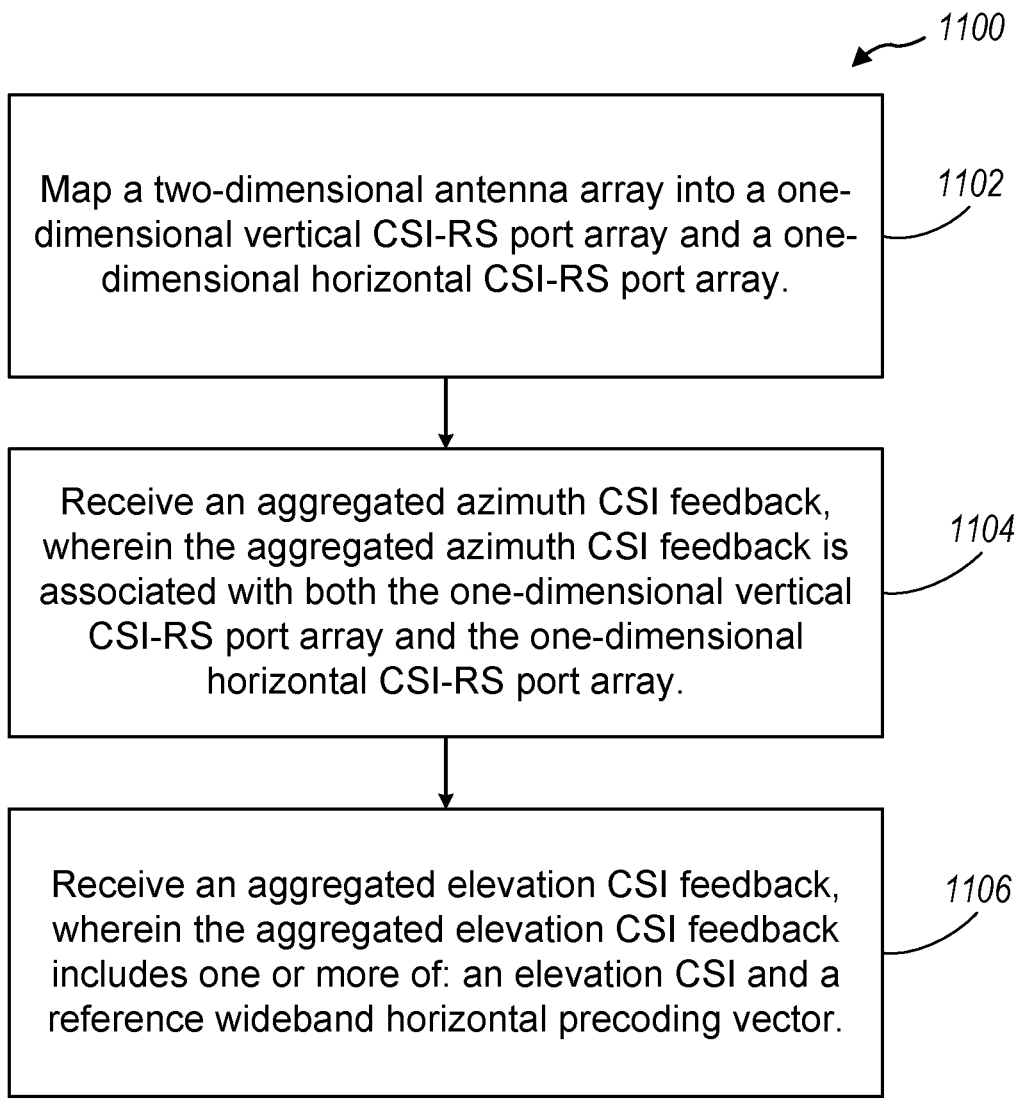
FIG. 11 is a functional block diagram illustrating exemplary blocks executed to implement one aspect of the present disclosure.

FIG. 11 is a functional block diagram 1100 illustrating exemplary blocks executed to implement one aspect of the present disclosure. At block 1102, a network entity, such as an eNB, may map a two-dimensional antenna array into a one-dimensional vertical CSI-RS port array and a one-dimensional horizontal CSI-RS port array. At block 1104, the eNB may receive an aggregated azimuth CSI feedback. The aggregated azimuth CSI feedback may be associated with both the one-dimensional vertical CSI-RS port array and the one-dimensional horizontal CSI-RS port array. The aggregated azimuth CSI feedback may be further associated with azimuth CSI feedback and a reference wideband vertical precoding vector. A UE-specific intra-sub-array weight vector and/or a UE-specific inter-sub-array weight vector for the mapping may be generated based the reference wideband vertical precoding vector. Accordingly, data may be transmitted from the one-dimensional horizontal CSI-RS port array mapped based on the UE-specific intra-sub-array weight vector. Correspondingly, the UE may transmit aggregated azimuth CSI feedback to the eNB. The UE may determine azimuth CQI based on the reference wideband vertical precoding vector.

At block 1106, the eNB may receive an aggregated elevation CSI feedback. The aggregated elevation CSI feedback may be associated with both the one-dimensional vertical CSI-RS port array and the one-dimensional horizontal CSI-RS port array. The aggregated elevation CSI feedback may be further associated with elevation CSI feedback and a reference wideband horizontal precoding vector. A UE-specific intra-sub-array weight vector and/or a UE-specific inter-sub-array weight vector for the mapping may be generated based the reference wideband horizontal precoding vector. Accordingly, data may be transmitted from the one-dimensional vertical CSI-RS port array mapped based on the UE-specific intra-sub-array weight vector. Correspondingly, the UE may transmit aggregated elevation CSI feedback to the eNB. The UE may determine elevation CQI based on the reference wideband horizontal precoding vector.

In some aspects of the present disclosure, eNB may transmit data from the one-dimensional vertical CSI-RS port array, the one-dimensional horizontal CSI-RS port array, or both. The eNB may apply dynamic point selection to determine to transmit data from the one-dimensional vertical CSI-RS port array or from the one-dimensional horizontal CSI-RS port array based on received CSI from one or more UEs.

Figure 12:
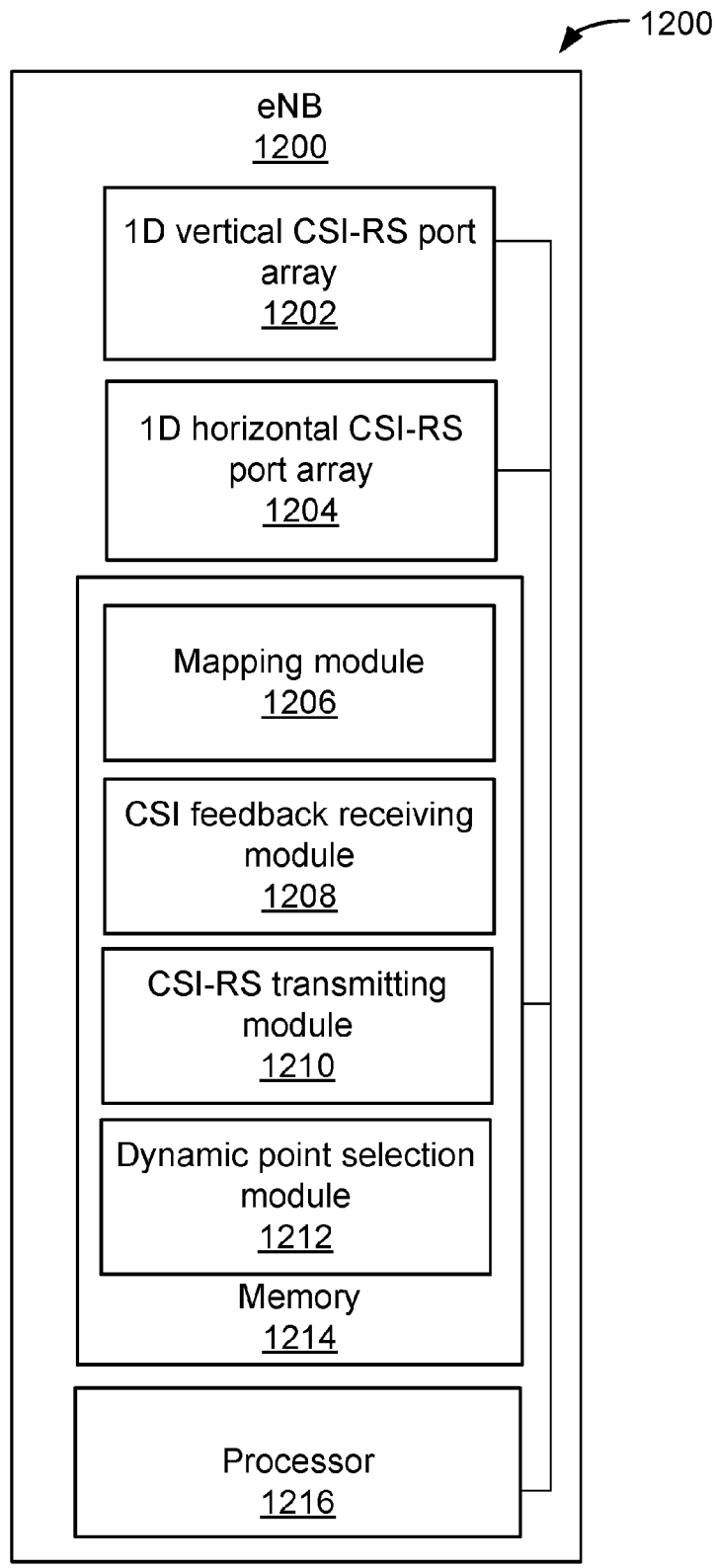
FIG. 12 is a block diagram of an eNB in a communication network according to one aspect of the present disclosure.

FIG. 12 is a block diagram of an eNB 1200 in a communication network according to one aspect of the present disclosure. eNB 1200 may include a memory 1214 that may store data and program codes for execution of a mapping module 1206, a CSI feedback receiving module 1208, a CSI-RS transmitting module 1210, and a dynamic point selection module 1212. Mapping module 1206 may be used to map a 2D antenna array into a 1D vertical CSI-RS port array 1202 for receiving elevation CSI feedback and a 1D horizontal CSI-RS port array 1204 for receiving azimuth CSI feedback. The 2D antenna array may be divided into multiple sub-arrays for the mapping. Mapping module 1206 may apply intra-sub-array antenna aggregation in each of the plurality of sub-arrays and may also apply inter-sub-array antenna aggregation among the plurality of sub-arrays. CSI feedback receiving module 1208 may be used to receive and process independent or aggregated elevation and azimuth CSI feedback from one or more UEs. The elevation CSI feedback may include elevation PMI, elevation RI, elevation CQI, and the like. The azimuth CSI feedback may include azimuth PMI, azimuth RI, azimuth CQI, and the like. The elevation CSI feedback and azimuth CSI feedback may be received separately or jointly at CSI feedback receiving module 1208 of eNB 1200. CSI-RS transmitting module 1210 may be used to transmit one or more elevation CSI-RS from 1D vertical CSI-RS port array 1202 and/or transmit one or more azimuth CSI-RS from 1D horizontal CSI-RS port array 1204 to the one or more UEs. Dynamic point selection module 1212 may be used to determine to transmit data from 1D vertical CSI-RS port array 1202 or 1D azimuth CSI-RS port array 1204 based on received independent or aggregated elevation and azimuth CSI feedback, e.g., elevation and azimuth CQI eNB 1200 may also include a processor 1216 to perform or execute program codes that are stored in memory 1214 and control 1D vertical CSI-RS port array 1202, 1D horizontal CSI-RS port array 1204, and/or other components of eNB 1200. Processor 1216 and/or other processors at eNB 1200 may also perform or direct the execution of the functional blocks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 9-12 may comprise processors, electronics devices, hardware devices, electronics components, logical circuits, memories, software codes, firmware codes, etc., or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
dividing a two-dimensional antenna array to a plurality of sub-arrays, wherein each of the plurality of sub-arrays comprises a same number of antenna elements;
mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the mapping includes applying intra-sub-array antenna aggregation in each of the plurality of sub-arrays and applying inter-sub-array antenna aggregation among the plurality of sub-arrays, wherein the one-dimensional vertical CSI-RS port array includes an M-port cross-polarized CSI-RS array for M-port elevation CSI feedback, wherein the one-dimensional horizontal CSI-RS port array includes an N-port cross-polarized CSI-RS array for N-port azimuth CSI feedback, and M represents a column number or a subset of the column number of the two-dimensional antenna array and N represent a row number or a subset of the row number of the two-dimensional antenna array, wherein the applying the inter-sub-array antenna aggregation includes utilizing inter-sub-array aggregation weight vectors for the mapping, and wherein the inter-sub-array aggregation weight vector for the mapping to the one-dimensional vertical CSI-RS port array and the inter-sub-array aggregation weight vector for the mapping to the one-dimensional horizontal CSI-RS port array are selected so that patterns of the one-dimensional vertical CSI-RS port array and one-dimensional horizontal CSI-RS port array are complementary to each other; and transmitting one or more elevation CSI-RS from the one-dimensional vertical CSI-RS port array and one or more azimuth CSI-RS from the one-dimensional horizontal CSI-RS port array.

2. The method of claim 1, wherein numbers of CSI ports of the elevation CSI feedback and of the azimuth CSI feedback for the subset of antenna elements of the two-dimensional antenna array are determined based on a capability of a user equipment (UE).

3. A method for wireless communication, comprising:
dividing a two-dimensional antenna array to a plurality of sub-arrays, wherein each of the plurality of sub-arrays comprises a same number of antenna elements;
mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the mapping includes applying intra-sub-array antenna aggregation in each of the plurality of sub-arrays and applying inter-sub-array antenna aggregation among the plurality of sub-arrays; and
transmitting one or more elevation CSI-RS from the one-dimensional vertical CSI-RS port array and one or more azimuth CSI-RS from the one-dimensional horizontal CSI-RS port array,
wherein the applying the intra-sub-array antenna aggregation includes aggregating all rows of the antenna elements in each of the plurality of sub-arrays to form a plurality of aggregated vertical sub-arrays and aggregating all columns of the antenna elements in each of the plurality of sub-arrays to form a plurality of aggregated horizontal sub-arrays, wherein the applying the inter-sub-array antenna aggregation includes utilizing inter-sub-array aggregation weight vectors for the mapping, and wherein the inter-sub-array aggregation weight vector for the mapping to the one-dimensional vertical CSI-RS port array and the inter-sub-array aggregation weight vector for the mapping to the one-dimensional horizontal CSI-RS port array are selected so that patterns of the one-dimensional vertical CSI-RS port array and one-dimensional horizontal CSI-RS port array are complementary to each other.

4. The method of claim 3, wherein the applying the inter-sub-array antenna aggregation includes aggregating the plurality of aggregated vertical sub-arrays to form the one-dimensional vertical CSI-RS port array and aggregating the plurality of aggregated horizontal sub-arrays to form the one-dimensional horizontal CSI-RS port array.

5. A method for wireless communication, comprising:
dividing a two-dimensional antenna array to a plurality of sub-arrays, wherein each of the plurality of sub-arrays comprises a same number of antenna elements;
mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the mapping includes applying intra-sub-array antenna aggregation in each of the plurality of sub-arrays and applying inter-sub-array antenna aggregation among the plurality of sub-arrays, wherein the applying the intra-sub-array antenna aggregation includes utilizing intra-sub-array aggregation weight vectors for the mapping, wherein the applying the inter-sub-array antenna aggregation includes utilizing inter-sub-array aggregation weight vectors for the mapping, and wherein at least one of:
the inter-sub-array aggregation weight vector for the mapping to the one-dimensional vertical CSI-RS port array and the inter-sub-array aggregation weight vector for the mapping to the one-dimensional horizontal CSI-RS port array are selected so that patterns of the one-dimensional vertical CSI-RS port array and one-dimensional horizontal CSI-RS port array are complementary to each other; or
the intra-sub-array aggregation weight vector and inter-sub-array aggregation weight vectors for the mapping to the one-dimensional vertical CSI-RS port array and the one-dimensional horizontal CSI-RS port array are determined based on one or more of: a number of the antenna elements in a column of the two-dimensional antenna array, spacing between the antenna elements, a target down tilt, and elevation dimension coverage; and
transmitting one or more elevation CSI-RS from the one-dimensional vertical CSI-RS port array and one or more azimuth CSI-RS from the one-dimensional horizontal CSI-RS port array.

6. The method of claim 5, wherein the inter-sub-array aggregation weight vector for the mapping to the one-dimensional vertical CSI-RS port array and the inter-sub-array aggregation weight vector for the mapping to the one-dimensional horizontal CSI-RS port array are selected so that patterns of the one-dimensional vertical CSI-RS port array and one-dimensional horizontal CSI-RS port array are complementary to each other.

7. The method of claim 5, wherein the intra-sub-array aggregation weight vector and inter-sub-array aggregation weight vectors for the mapping to the one-dimensional vertical CSI-RS port array and the one-dimensional horizontal CSI-RS port array are determined based on one or more of: a number of the antenna elements in a column of the two-dimensional antenna array, spacing between the antenna elements, a target down tilt, and elevation dimension coverage.

8. An apparatus for wireless communication, comprising:
means for dividing a two-dimensional antenna array to a plurality of sub-arrays, wherein each of the plurality of sub-arrays comprises a same number of antenna elements;
means for mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the means for mapping includes means for applying intra-sub-array antenna aggregation in each of the plurality of sub-arrays and means for applying inter-sub-array antenna aggregation among the plurality of sub-arrays, wherein the one-dimensional vertical CSI-RS port array includes an M-port cross-polarized CSI-RS array for M-port elevation CSI feedback, wherein the one-dimensional horizontal CSI-RS port array includes an N-port cross-polarized CSI-RS array for N-port azimuth CSI feedback, wherein M represents a column number or a subset of the column number of the two-dimensional antenna array and N represent a row number or a subset of the row number of the two-dimensional antenna array, wherein the means for applying the inter-sub-array antenna aggregation includes means for utilizing inter-sub-array aggregation weight vectors for the mapping, and wherein the inter-sub-array aggregation weight vector for the means for mapping to the one-dimensional vertical CSI-RS port array and the inter-sub-array aggregation weight vector for the means for mapping to the one-dimensional horizontal CSI-RS port array are selected so that patterns of the one-dimensional vertical CSI-RS port array and one-dimensional horizontal CSI-RS port array are complementary to each other; and means for transmitting one or more elevation CSI-RS from the one-dimensional vertical CSI-RS port array and one or more azimuth CSI-RS from the one-dimensional horizontal CSI-RS port array.

9. The apparatus of claim 8, wherein numbers of CSI ports of the elevation CSI feedback and of the azimuth CSI feedback for the subset of antenna elements of the two-dimensional antenna array are determined based on a capability of a user equipment (UE).

10. An apparatus for wireless communication, comprising:

means for dividing a two-dimensional antenna array to a plurality of sub-arrays, wherein each of the plurality of sub-arrays comprises a same number of antenna elements;

means for mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the means for mapping includes means for applying intra-sub-array antenna aggregation in each of the plurality of sub-arrays and means for applying inter-sub-array antenna aggregation among the plurality of sub-arrays, wherein the means for applying the intra-sub-array antenna aggregation includes means for aggregating all rows of the antenna elements in each of the plurality of sub-arrays to form a plurality of aggregated vertical sub-arrays and means for aggregating all columns of the antenna elements in each of the plurality of sub-arrays to form a plurality of aggregated horizontal sub-arrays, wherein the means for applying the inter-sub-array antenna aggregation includes means for utilizing inter-sub-array aggregation weight vectors for the mapping, and wherein the inter-sub-array aggregation weight vector for the means for mapping to the one-dimensional vertical CSI-RS port array and the inter-sub-array aggregation weight vector for the means for mapping to the one-dimensional horizontal CSI-RS port array are selected so that patterns of the one-dimensional vertical CSI-RS port array and one-dimensional horizontal CSI-RS port array are complementary to each other; and means for transmitting one or more elevation CSI-RS from the one-dimensional vertical CSI-RS port array and one or more azimuth CSI-RS from the one-dimensional horizontal CSI-RS port array.

11. The apparatus of claim 10, wherein the means for applying the inter-sub-array antenna aggregation includes means for aggregating the plurality of aggregated vertical sub-arrays to form the one-dimensional vertical CSI-RS port array and means for aggregating the plurality of aggregated horizontal sub-arrays to form the one-dimensional horizontal CSI-RS port array.

12. An apparatus for wireless communication, comprising:

means for dividing a two-dimensional antenna array to a plurality of sub-arrays, wherein each of the plurality of sub-arrays comprises a same number of antenna elements;

means for mapping the two-dimensional antenna array into a one-dimensional vertical channel state information reference signal (CSI-RS) port array for receiving elevation CSI feedback and a one-dimensional horizontal CSI-RS port array for receiving azimuth CSI feedback, wherein the means for mapping includes means for applying intra-sub-array antenna aggregation in each of the plurality of sub-arrays and means for applying inter-sub-array antenna aggregation among the plurality of sub-arrays, wherein the means for applying the intra-sub-array antenna aggregation includes means for utilizing intra-sub-array aggregation weight vectors for the mapping, wherein the means for applying the inter-sub-array antenna aggregation includes means for utilizing inter-sub-array aggregation weight vectors for the mapping, and wherein at least one of:

the inter-sub-array aggregation weight vector for the means for mapping to the one-dimensional vertical CSI-RS port array and the inter-sub-array aggregation weight vector for the means for mapping to the one-dimensional horizontal CSI-RS port array are selected so that patterns of the one-dimensional vertical CSI-RS port array and one-dimensional horizontal CSI-RS port array are complementary to each other; or the intra-sub-array aggregation weight vector and inter-sub-array aggregation weight vectors for the means for mapping to the one-dimensional vertical CSI-RS port array and the one-dimensional horizontal CSI-RS port array are determined based on one or more of: a number of the antenna elements in a column of the two-dimensional antenna array, spacing between the antenna elements, a target down tilt, and elevation dimension coverage; and means for transmitting one or more elevation CSI-RS from the one-dimensional vertical CSI-RS port array and one or more azimuth CSI-RS from the one-dimensional horizontal CSI-RS port array.

13. The apparatus of claim 12, wherein the inter-sub-array aggregation weight vector for the means for mapping to the one-dimensional vertical CSI-RS port array and the inter-sub-array aggregation weight vector for the means for mapping to the one-dimensional horizontal CSI-RS port array are selected so that patterns of the one-dimensional vertical CSI-RS port array and one-dimensional horizontal CSI-RS port array are complementary to each other.

14. The apparatus of claim 12, wherein the intra-sub-array aggregation weight vector and inter-sub-array aggregation weight vectors for the means for mapping to the one-dimensional vertical CSI-RS port array and the one-dimensional horizontal CSI-RS port array are determined based on one or more of: a number of the antenna elements in a column of the two-dimensional antenna array, spacing between the antenna elements, a target down tilt, and elevation dimension coverage.

* * * * *